United States Patent
Kobayashi et al.

[11] Patent Number: 5,880,198
[45] Date of Patent: Mar. 9, 1999

[54] THERMOPLASTIC RESIN COMPOSITION COMPRISING PROPYLENE ELASTOMER, AND TALC COMPONENTS

[75] Inventors: Akira Kobayashi; Hironori Mouri; Akira Amano; Yuji Fujita, all of Tokyo, Japan

[73] Assignee: Tonen Chemical Corporation, Tokyo, Japan

[21] Appl. No.: 807,358

[22] Filed: Feb. 27, 1997

[30] Foreign Application Priority Data

| Mar. 4, 1996 | [JP] | Japan | 8-73220 |
| Mar. 4, 1996 | [JP] | Japan | 8-73222 |
| Mar. 4, 1996 | [JP] | Japan | 8-73234 |
| Mar. 4, 1996 | [JP] | Japan | 8-73235 |
| Mar. 29, 1996 | [JP] | Japan | 8-103284 |
| Mar. 29, 1996 | [JP] | Japan | 8-103288 |

[51] Int. Cl.$^6$ .................. C08L 53/02; C08K 3/34
[52] U.S. Cl. ................ 524/451; 525/89; 525/98; 525/99
[58] Field of Search .................. 525/89, 95, 98, 525/99; 524/451

[56] References Cited

U.S. PATENT DOCUMENTS

| 5,045,589 | 9/1991 | Ueno . | |
| 5,283,267 | 2/1994 | Nishio et al. . | |
| 5,412,020 | 5/1995 | Yamamoto et al. | 525/88 |
| 5,432,209 | 7/1995 | Sobajima et al. | 523/200 |

FOREIGN PATENT DOCUMENTS

| 0 463 963 | 1/1992 | European Pat. Off. . |
| 0 697 435 | 2/1996 | European Pat. Off. . |
| 1-149845 | 6/1989 | Japan . |
| 2 281 302 | 3/1995 | United Kingdom . |

*Primary Examiner*—Jeffrey C. Mullis
*Attorney, Agent, or Firm*—Sughrue, Mion, Zinn, Macpeak & Seas, PLLC

[57] ABSTRACT

A thermoplastic resin composition comprising a propylene polymer component, a styrene-containing elastomer component and talc. The propylene polymer component may be an ethylene-propylene block copolymer, polypropylene resin, a mixture of at least two propylene polymers each having different melt flow rate. The styrene-containing elastomer may be an elastomeric styrene-containing block copolymer represented by the following formula (I) or (II):

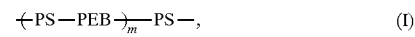

(I)

and

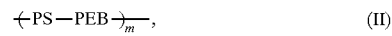 (II)

wherein PS is a polystyrene block, PEB is a poly(ethylene-butene) block and m is an integer of 1 or more. Also, the styrene-containing elastomer may be a mixture of the elastomeric styrene-containing block copolymers having different melt flow rates.

7 Claims, No Drawings

THERMOPLASTIC RESIN COMPOSITION COMPRISING PROPYLENE ELASTOMER, AND TALC COMPONENTS

BACKGROUND OF THE INVENTION

The present invention relates to a thermoplastic resin composition comprising a propylene polymer, an elastomeric styrene-containing block copolymer and a talc. The resin composition is excellent, in particular, in injection moldability and provides molded articles having a good mechanical strength.

Polypropylene has a good mechanical strength and a good moldability in spite of its low density, and is widely utilized in various application fields. However, polypropylene is insufficient in the impact resistance and the heat resistance. To improve these defects, various polypropylene resin compositions, for example, those comprising an ethylene-propylene block copolymer produced by a multi-stage polymerization, a rubber component such as an ethylene-propylene copolymer rubber and an ethylene-butene copolymer rubber, and an inorganic filler such as talc have been proposed.

Japanese Patent Laid-Open No. 1-149845 discloses a resin composition comprising (a) 59 to 74 weight % a propylene-ethylene block copolymer, (b) 35 to 20 weight % of an ethylene-propylene copolymer rubber, and (c) 3 to 6 weight % of talc having a specific surface area of 30,000 cm$^2$/g or more and an average particle size of 0.5 to 2.0 $\mu$m. The propylene-ethylene block copolymer has an ethylene content of 1 to 7 weight % and a melt flow rate of 15 to 50 g/10 min. The propylene-ethylene block copolymer is further specified by containing 5 to 12 weight % of a boiling xylene solubles having an ethylene content of 20 to 60 weight %. The ethylene-propylene copolymer rubber is characterized by a propylene content of 20 to 60 weight % and a Mooney viscosity (ML$_{1+4}$(100° C.)) of 100 to 150. The resin composition contains a fine talc. The fine particles of talc are easily agglomerated together to deteriorate a balance of mechanical strength such as hardness, stiffness, impact strength at low temperature, etc. Also, a great specific surface area of the fine talc makes the fine talc particles highly adherent, and the additives are adhered on the fine particles of talc to fail in exhibiting their ability. To eliminate this problem, it has been proposed to subject the fine talc to a surface treatment by a surface-treating agent of aminosilane type, titanate type, etc. to improve the dispersibility of talc thereby preventing the additives from being adhered to the talc. However, such a proposal is still insufficient.

To improve the impact resistance of the conventional polypropylene, it has been also proposed to increase the content of the ethylene-propylene copolymer block in the ethylene-propylene block copolymer, or to add a rubber component such as an ethylene-propylene copolymer rubber and an ethylene-butene copolymer rubber in an increased amount. However, these modification is not successful because the fluidity of the resultant resin composition is decreased. Also, the addition of the rubber component in a large amount reduces the heat resistance and the surface hardness of the molded articles.

In view of improving the productivity, the demand for making the molded articles large in their size and reducing the thickness of the molded articles. This demand in turn requires to provide a molding material of high performance. To meet such a demand, it is inevitable for the molding material to be further improved in its fluidity and be made more sufficient in its performance. However, the conventional molding material comprising an ethylene-propylene block copolymer and a polyolefin elastomer has failed to meet this demand because the demand exceeds the limit of improvement achieved by the conventional molding material.

OBJECT AND SUMMARY OF THE INVENTION

Accordingly, an object of the present invention is to provide a thermoplastic resin composition having a good moldability and providing a molded article of a good mechanical strength.

As a result of the intense research in view of the above object, the inventors have found that the above problems in the prior art can be eliminated by blending a specific ethylene-propylene block copolymer or a specific propylene resin with a specific elastomeric styrene-containing block copolymer and talc. The inventors have further found that the above problems in the prior art can also be eliminated by blending a least two different kinds of propylene polymers having different melt flow rates with a specific elastomeric styrene-containing block copolymer and talc. The present invention has been accomplished based on the above findings.

Thus, in a first aspect of the present invention, there is provided a thermoplastic resin composition comprising: (A) 30 to 80 weight % of an ethylene-propylene block copolymer having a melt flow rate of 30 to 200 g/10 min and comprising (a) 70 to 99 weight % of a crystalline propylene polymer block and (b) 1 to 30 weight % of an ethylene-propylene copolymer block having an ethylene content of 20 to 80 weight % and an intrinsic viscosity [$\eta$]$_{CXS}$ of 2 to 7 dl/g; (B) 10 to 30 weight % of an elastomeric styrene-containing block copolymer having a melt flow rate of 0.5 to 40 g/10 min and a polystyrene block content of 10 to 30 weight %, and being represented by the following formula (I) or (II):

 (I)

and

 (II)

wherein PS is the polystyrene block, PEB is an poly (ethylene-butene) block and m is an integer of 1 or more; and (C) 10 to 40 weight % of talc having an average particle size of 5 $\mu$m or less.

In a second aspect of the present invention, there is provided a thermoplastic resin composition comprising: (A) 30 to 80 weight % of a polypropylene resin having a melt flow rate of 20 to 200 g/10 min, an isotactic pentad fraction of 95% of more and a copolymer block content of 0 to 2 weight %; (B) 10 to 30 weight % of a elastomeric styrene-containing block copolymer having a melt flow rate of 0.5 to 40 g/10 min and a polystyrene block content of 10 to 30 weight %, and being represented by the following formula (I) or (II):

 (I)

and

 (II)

wherein PS is the polystyrene block, PEB is an poly (ethylene-butene) block and m is an integer of 1 or more;

and (C) 10 to 40 weight % of talc having an average particle size of 5 μm or less.

In a third aspect of the present invention, there is provided a thermoplastic resin composition comprising: (A) 30 to 80 weight % of an ethylene-propylene block copolymer having a melt flow rate of 30 to 200 g/10 min and comprising (a) 70 to 99 weight % of a crystalline propylene polymer block and (b) 1 to 30 weight % of an ethylene-propylene copolymer block having an ethylene content of 20 to 80 weight % and an intrinsic viscosity $[\eta]_{CXS}$ of 2 to 7 dl/g; (B) 5 to 30 weight % of a binary elastomer comprising (a) 40 to 80 weight % of at least one elastomeric styrene-containing block copolymer having a melt flow rate of 0.5 to 3 g/10 min and a polystyrene block content of 10 to 30 weight % and (b) 20 to 60 weight % of another at least one elastomeric styrene-containing block copolymer having a melt flow rate of 4 to 100 g/10 min and a polystyrene block content of 10 to 30 weight %, and each of the elastomeric styrene-containing block copolymers constituting the binary elastomer being represented by the following formula (I) or (II):

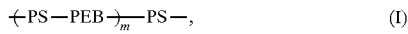  (I)

and

  (II)

wherein PS is the polystyrene block, PEB is an poly(ethylene-butene) block and m is an integer of 1 or more; and (C) 10 to 40 weight % of talc having an average particle size of 5 μm or less.

In a fourth aspect of the present invention, there is provided a thermoplastic resin composition comprising: (A) 30 to 80 weight % of a polypropylene resin having a melt flow rate of 20 to 200 g/10 min, an isotactic pentad fraction of 95% or more and a copolymer block content of 0 to 2 weight %; (B) 5 to 30 weight % of a binary elastomer comprising (a) 40 to 80 weight % of at least one elastomeric styrene-containing block copolymer having a melt flow rate of 0.5 to 3 g/10 min and a polystyrene block content of 10 to 30 weight % and (b) 20 to 60 weight % of another at least one elastomeric styrene-containing block copolymer having a melt flow rate of 4 to 100 g/10 min and a polystyrene block content of 10 to 30 weight %, and each of the styrene-containing block copolymers constituting the binary elastomer being represented by the following formula (I) or (II):

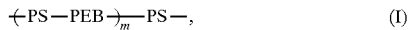  (I)

and

  (II)

wherein PS is the polystyrene block, PEB is an poly(ethylene-butene) block and m is an integer of 1 or more; and (C) 10 to 40 weight % of talc having an average particle size of 5 μm or less.

In a fifth aspect of the present invention, there is provided a thermoplastic resin composition comprising: (A) 10 to 50 weight % of at least one first propylene polymer component selected from the group consisting of a first homopolypropylene and a first ethylene-propylene block copolymer, each having a melt flow rate of 2 to 30 g/10 min; (B) 10 to 50 weight % of at least one second propylene polymer component selected from the group consisting of a second homopolypropylene and a second ethylene-propylene block copolymer, each having a melt flow rate of 50 to 1000 g/10 min; (C) 10 to 30 weight % of an elastomeric styrene-containing block copolymer having a melt flow rate of 0.5 to 40 g/10 min and a polystyrene block content of 10 to 30 weight %, and being represented by the following formula (I) or (II):

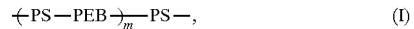  (I)

and

  (II)

wherein PS is the polystyrene block, PEB is a poly(ethylene-butene) block and m is an integer of 1 or more; and (D) 10 to 40 weight % of talc having an average particle size of 5 μm or less.

In a sixth aspect of the present invention, there is provided a thermoplastic resin composition comprising: (A) 10 to 50 weight % of at least one first propylene polymer component selected from the group consisting of a first homopolypropylene and an ethylene-propylene random copolymer, the first homopolypropylene having a melt flow rate of 2 to 30 g/10 min and an isotactic pentad fraction of 90 to 95%, and the ethylene-propylene random copolymer having a melt flow rate of 2 to 30 g/10 min and an ethylene content of 0.1 to 1 weight %; (B) 10 to 50 weight % of a second homopolypropylene having a melt flow rate of 50 to 1000 g/10 min; (C) 10 to 30 weight % of an elastomeric styrene-containing block copolymer having a melt flow rate of 0.5 to 40 g/10 min and a polystyrene block content of 10 to 30 weight %, and being represented by the following formula (I) or (II):

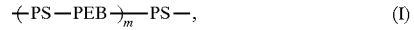  (I)

and

  (II)

wherein PS is the polystyrene block, PEB is a poly(ethylene-butene) block and m is an integer of 1 or more; and (D) 10 to 40 weight % of talc having an average particle size of 5 μm or less.

DETAILED DESCRIPTION OF THE INVENTION

[1] First Thermoplastic Resin Composition

The first preferred thermoplastic resin composition of the present invention contains the following (A) a propylene polymer component, (B) a styrene-containing elastomer component, and (C) talc as the essential components.

A Propylene polymer component

The first preferred thermoplastic resin composition contains an ethylene-propylene block copolymer or a propylene resin as the propylene polymer component in an amount of 30 to 80 weight %, preferably 50 to 80 weight % based on the total weight of the components (A), (B) and (C). If the content is less than 30 weight %, the stiffness, heat resistance and hardness of the molded articles are poor, and mechanical strength and ductility are reduced when exceeding 80 weight %.

A-1 Ethylene-propylene block copolymer

The ethylene-propylene block copolymer used in the present invention substantially comprises (a) a crystalline propylene polymer block composed of repeating propylene units and (b) an ethylene-propylene copolymer block composed of randomly copolymerized ethylene units and propylene units, and optionally contains (c) a crystalline ethylene polymer block composed of repeating ethylene units. The content of the crystalline propylene polymer block (a) is 70 to 99 weight %, preferably 85 to 97 weight %, and the content of the ethylene-propylene copolymer block (b) is 1 to 30 weight %, preferably 3 to 15 weight %, each based on the total weight of (a) and (b). If the each content is outside the above range, the mechanical properties of the resulting molded articles are not well balanced. The crystalline ethylene polymer block (c) may be optionally or unintentionally contained in an amount of 5 weight % or less based on the weight of the ethylene-propylene block copolymer.

The crystalline propylene polymer block is derived from a propylene homopolymer or a propylene copolymer containing a small amount (5 mol % or less) of α-olefin such as butene-1, octene-1, etc. as a comonomer component.

The ethylene-propylene copolymer block is an ethylene-propylene copolymer of a low crystallinity. The ethylene content in the ethylene-propylene copolymer block is 20 to 80 weight %, preferably 35 to 65 weight % based on the total weight of the ethylene-propylene copolymer block. If the ethylene content is outside the above range, the ductility of the resin composition is insufficient. The ethylene-propylene copolymer block may contain α-olefin such as butene-1, octene-1, etc. as the third component in an amount 5 mol % or less. An intrinsic viscosity ($[\eta]_{CXS}$) is 2 to 7 dl/g, preferably 3 to 5 dl/g. When $[\eta]_{CXS}$ is less than 2 dl/g, flow marks occur on the surface of the molded articles. On the other hand, the resin composition is less flowable when exceeding 7 dl/g.

The crystalline ethylene polymer block is optional and unintentionally incorporated into the ethylene-propylene block copolymer during the formation of the ethylene-propylene copolymer block in a slight amount, and may contain the same comonomer component as the third component of the ethylene-propylene copolymer block in an amount of 5 mol % or less.

The ethylene-propylene block copolymer comprising the above blocks has a melt flow rate (MFR) of 30 to 200 g/10 min, preferably 30 to 120 g/10 min when measured at 230° C. under a load of 2.16 kgf. When the MFR is less than 30 g/10 min, the resin composition is less flowable and the moldability, in particular, the injection moldability is deteriorated. An MFR exceeding 200 g/10 min undesirably reduces the mechanical strength of the molded articles.

In place of the ethylene-propylene copolymer block described above, an olefin elastomer such as an ethylene-propylene copolymer rubber and an ethylene-butene copolymer rubber may be used as far as the olefin elastomer has the ethylene content and $[\eta]_{CXS}$ in the above range. In this case, the MFR of the resin composition is preferred to be regulated within the range of 30 to 200 g/10 min by adding a crystalline propylene homopolymer.

The ethylene-propylene block copolymer may be produced by a known method. For example, it may be produced by a multistage polymerization comprising (a) forming the crystalline propylene polymer block by polymerizing propylene monomer with or without a slight amount of a comonomer by a single stage or multistage as employed in a known propylene polymerization; and (b) successively forming the ethylene-propylene copolymer block by copolymerizing ethylene monomer and propylene monomer in a single stage or multistage.

In the present invention, the amount of each of the crystalline propylene polymer block, the ethylene-propylene copolymer block and the crystalline ethylene polymer block was determined as follows. An amount of the ethylene-propylene block copolymer was introduced into a boiling xylene to dissolve only the ethylene-propylene copolymer block. The insoluble residue containing the crystalline propylene polymer block and the crystalline ethylene polymer block was further heated at 100° C. in xylene to remove the insoluble crystalline propylene polymer block.

A-2 Polypropylene resin

Another propylene polymer component of the thermoplastic resin composition of the first preferred embodiment is a polypropylene resin.

The polypropylene resin is a homopolypropylene resin or a polypropylene resin which has a crystalline random copolymer moiety or a block copolymer moiety each comprising a propylene unit and a unit of α-olefin such as ethylene, butene-1, pentene-1, 4-methylpentene-1, hexene-1, octene-1, etc. The content of each copolymer moiety is 0 to 2 weight %, preferably 0 to 1 weight % based on the total amount of the polymer. A content exceeding 2 weight % is undesirable because the molded articles have a poor impact strength at low temperatures and a raised embrittle temperature.

The polypropylene resin has a melt flow rate (MFR) of 20 to 200 g/10 min, preferably 40 to 180 g/10 min when measured at 230° C. under a load of 2.16 kgf. When the MFR is less than 20 g/10 min, the resin composition is less flowable. An MFR exceeding 200 g/10 min undesirably reduces the ductility of the resin composition.

A polypropylene resin having a high MFR can be directly produced by polymerization of the propylene monomer. However, in view of the productivity, the high MFR polypropylene resin is preferred to be produced by subjecting a polypropylene resin having a low MFR to a chain length regulating treatment in which a polypropylene resin having a low MFR is kneaded at 180° to 300° C. for 1 to 10 minutes in the presence of a chain length regulator such as an organic peroxide, sulfur-containing compound, etc. to reduce the chain length, i.e., reduce the molecular weight.

The polypropylene resin of the present invention has a stereospecificity, represented by an isotactic pentad fraction (IPF), of 95% or more, preferably 97% or more. If IPF is less than 95%, the polypropylene resin is low in the crystallinity to give the molded articles having a poor stiffness and a low heat distortion temperature. The IPF is a fraction ratio of the number of five continuous propylene monomer units (pentad) bonded isotactically to the total number of five continuous propylene monomer units determined by a method described in A. Zambelli et al.; Macromolecules, 6, 925 (1973) which includes measuring $^{13}$C-NMR spectra. The assignment of each peak of $^{13}$C-NMR spectra was made according to a method described in Macromolecules, 8, 687 (1975). The IPF was calculated by dividing the peak intensity of mmmm peak by the total of the peak intensities of all the methyl carbons in the n-heptane insolubles of the polypropylene.

The above polypropylene resin may be produced by various known method, and preferably by polymerizing the propylene monomer in the presence of a stereo-specific polymerization catalyst by a known slurry polymerization, solution polymerization, liquid phase polymerization using olefin monomer as the medium, vapor phase polymerization, etc.

In a more specific example, the propylene monomer is polymerized in the presence of a catalyst system comprising a transition metal compound such as titanium trichloride, titanium tetrachloride, etc. alone or carried on a support mainly composed of a magnesium halide such as magnesium chloride, etc., and a organoaluminum compound such as triethylaluminum, diethylaluminum chloride, etc. After polymerizing the propylene monomer, the copolymer moiety (2 weight % of less) may be introduced by further polymerizing a comonomer. The copolymer moiety is random and the content thereof may be determined as cold xylene solubles.

B Styrene-containing elastomer component

The second component of the thermoplastic resin composition of the first preferred embodiment is the styrene-containing elastomer component which is an elastomeric styrene-containing block copolymer or a binary elastomer which is a mixture of elastomeric styrene-containing block copolymers having different melt flow rates.

B-1 Elastomeric styrene-containing block copolymer

The elastomeric styrene-containing block copolymer is represented by the formula (I) or (II):

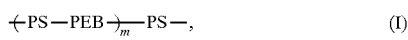  (I)

and

  (II)

wherein PS is a polystyrene block, PEB is poly(ethylene-butene) block and m is an integer of 1 or more. The integer m is preferably 1 to 4, and more preferably 1 to 2.

The elastomeric styrene-containing block copolymer may be produced by block-copolymerizing a monovinylaromatic compound and a conjugated diene, and subsequently hydrogenating the resulting block copolymer. In the present invention, styrene and 1,3-butadiene are preferably used to obtain a block copolymer comprising a polystyrene block and a poly(ethylene-butene) block, and the block copolymer is then hydrogenated to produce the elastomeric styrene-containing block copolymer. It is preferable that 90 mol % or more of the aliphatic unsaturated bonds are hydrogenated, and an elastomeric styrene-containing block copolymer having no aliphatic unsaturated bond is preferably used in the present invention in view of weathering resistance and easy recycling of the wasted molded articles.

Of the elastomeric styrene-containing block copolymers represented by the formulae (I) and (II), preferred are those having two or more blocks consisting of the PS block and the PEB block, and more preferred are those having three or more blocks consisting of the PS block, the PEB block and the PS block. These elastomers are so-called as a styrene-ethylene-butene block copolymer elastomer (SEB) or a styrene-ethylene-butene-styrene copolymer elastomer (SEBS).

The elastomeric styrene-containing block copolymer has an MFR of 0.5 to 40 g/10 min, preferably 0.5 to 30 g/10 min. If the MFR is less than 0.5 g/10 min, the moldability is deteriorated due to insufficient fluidity of the resin composition, and the impact strength of the molded articles is poor. On the other hand, an MFR exceeding 40 g/10 min results in a poor ductility of the resin composition and insufficient impact strength of the molded articles.

The styrene-containing elastomer component is contained in the resin composition in an amount of 10 to 30 weight %, preferably 10 to 25 weight % based on the total of the components (A), (B) and (C). If the content is less than 10 weight %, the impact strength of the molded articles is poor, and mechanical strength, stiffness, heat resistance and hardness of the molded articles are reduced when exceeding 30 weight %.

B-2 Binary elastomer

Each of the elastomeric styrene-containing block copolymer (a) and the elastomeric styrene-containing block copolymer (b) constituting the binary elastomer is represented by the following formula (I) or (II):

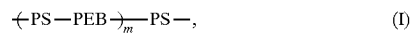  (I)

and

  (II)

wherein PS is a polystyrene block, PEB is poly(ethylene-butene) block and m is an integer of 1 or more.

In the elastomeric styrene-containing block copolymer (a), the integer m is preferably 1 to 4, and more preferably 1 to 2, and the content of PS is 10 to 30 weight %, preferably 25 to 30 weight %. The MFR is 0.5 to 3 g/10 min, preferably 1 to 3 g/10 min.

In the elastomeric styrene-containing block copolymer (b), the content of PS is 10 to 30 weight %, preferably 10 to 24 weight %. The integer m is preferably 1 to 4, and more preferably 1 to 2. The MFR of the elastomeric styrene-containing block copolymer (b) is 4 to 100 g/10 min, preferably 5 to 30 g/10 min.

Like the elastomeric styrene-containing block copolymer described in paragraph B-1, the elastomeric styrene-containing block copolymers (a) and (b) are also preferred to have a structure of -PS-PEB-(SEB) or -PS-PEB-PS-(SEBS), and produced by copolymerization and a subsequent hydrogenation.

The MFR of each elastomeric styrene-containing block copolymer may be controlled to the respective range by suitably selecting the amount of the polymerization initiator.

The weight ratio of the elastomeric styrene-containing block copolymers (a) and (b) in the binary elastomer ((a): (b)) is 40 to 80:20 to 60, preferably 50 to 75:25 to 50. If the ratio is outside the above range, the ductility and impact strength would be deteriorate and the brittle temperature would be raised. In addition, the difference of MFR (MFR (b)–MFR(a)) is preferably 3 g/10 min or more, more preferably 5 to 20 g/10 min in view of improving the impact strength and preventing the brittle temperature from being raised.

Also, the binary elastomer may contain two or more of the elastomeric styrene-containing block copolymers (a) and/or two or more of the elastomeric styrene-containing block copolymers (b).

The binary elastomer component is contained in the resin composition in an amount of 5 to 30 weight %, preferably 10 to 25 weight % based on the total of the components (A), (B) and (C). If the content is less than 5 weight %, the impact strength of the molded articles is poor, and mechanical strength, stiffness, heat resistance and hardness of the molded articles are reduced when exceeding 30 weight %.

C Talc

Talc used in the present invention is characterized by an average particle size of 5 μm or less, preferably 3 to 5 μm, measured by a particle size distribution analyzer utilizing laser diffraction and scattering. If the average particle size exceeds 5 μm, the molded articles are insufficient in the stiffness and the dimension stability. The talc is preferred to be surface-treated by a modified silicone, titanate coupling agent, etc., because such a treatment improves the stiffness and the heat resistance of the molded articles. The talc is contained 10 to 40 weight %, preferably 10 to 30 weight % based on the total of the components (A), (B) and (C). If the content is less than 10 weight %, the stiffness and the heat resistance of the molded articles are poor, and the ductility of the resin composition is reduced when exceeds 40 weight %.

D Other Additives

The thermoplastic resin composition of the present invention may contain an antioxidant, heat stabilizer and light stabilizer, respectively in an amount of 0.05 to 2 parts by weight based on 100 parts by weight of the total of the above components (A), (B) and (C), according to the application use such as inner lining or outer lining material for automobiles. If the amount is less than 0.05 parts, no detectable effect would be obtained. No additional effect would be obtained if an amount exceeding 2 parts is added, and in addition, the properties of the resin composition would be deteriorated.

The phenol-type antioxidant may include tetrakis [methylene-3(3,5-di-t-butyl-4-hydroxyphenyl)propionate] methane, 2,6-di-t-butyl-4-methylphenol, tris(3,5-di-t-butyl-4-hydroxyphenyl)isocyanurate, etc. The phosphorus-containing antioxidant may include tris(2,4-di-t-butylphenyl)phosphite, 4,4'-butylidene-bis(3-methyl-6-t-butylphenyl-di-tridecyl)phosphite, 1,1,3-tris(2-methyl-4-ditridecyl-phosphite-5-t-butyl), etc.

The heat stabilizer may include a sulfur-containing compound such as distearyl thiopropionate, dilauryl thiopropionate, etc.

The light stabilizer may include bis(2,2,6,6-tetramethyl-4-piperidine)sebacate, a condensate of succinic acid and dimethyl-1-(2-hydroxyethyl)-4-hydroxyl-2,2,6,6-tetramethylpiperidine, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], a condensate of N,N'-bis(3-aminopropyl)ethylenediamine-2,4-bis[N-butyl-N-(1,2,2,6,6-pentamethyl-4-piperidyl)amino]-6-chloro-1,3,5-triazine, etc.

The resin composition of the present invention may further contain other additives such as a releasing agent, an antistatic agent, a plasticizer, a fire retardant, a lubricant, an anti-copper-damage agent, an organic or inorganic pigment and a dispersant therefor, etc. to improve the properties of the resin composition according to the application use.

These additives are usually added at the time of mixing the essential components (A), (B) and (C). Also, the additives may be post-blended in the injection molding step as a masterbatch containing the additives in a high concentration.

The thermoplastic resin composition of the present invention may be produced by dry-blending the essential components and the optional additives, and then melt-kneading the blend at 180° to 300° C., preferably 190° to 210° C. in a single-screw extruder, a twin-screw extruder, Banbury mixer, a kneader, etc. The resin composition thus produced has an MFR of 20 to 50 g/10 min, preferably 25 to 35 g/10 min.

[2] Second Thermoplastic Resin Composition

The second preferred thermoplastic resin composition of the present invention contains (A) a first propylene polymer component having a relatively low melt flow rate, (B) a second propylene polymer component having a relatively high melt flow rate, (C) a styrene-containing elastomer component, and (D) talc as the essential components.

A First propylene polymer component

The first propylene polymer component is at least one selected from the group consisting of a first homopolypropylene and a first ethylene-propylene block copolymer, and is contained 10 to 50 weight %, preferably 10 to 40 weight % based on the total weight of the components (A), (B), (C) and (D). If the content is less than 10 weight %, the stiffness, heat resistance and hardness of the molded articles are poor, and mechanical strength and ductility are reduced when exceeding 50 weight %.

A-1 First homopolypropylene

The first homopolypropylene has a relatively low melt flow rate and may include a crystalline random copolymer and block copolymer each containing, as a copolymerized component, for example, an α-olefin such as ethylene, butene-1, pentene-1, 4-methylpentene-1, heptene-1, hexene-1, octene-1, etc. in a small amount up to about 1 weight %.

The first homopolypropylene has a melt flow rate (MFR) of 2 to 30 g/10 min, preferably 2 to 20 g/10 min when measured at 230° C. under a load of 2.16 kgf. When the MFR is less than 2 g/10 min, the resin composition is less flowable. An MFR exceeding 30 g/10 min undesirably reduces the ductility of the resin composition.

The isotactic pentad fraction (IPF) of the first homopolypropylene is preferably more than 95%, more preferably 97% or more.

The above first homopolypropylene may be produced by various known method, and preferably by polymerizing the propylene monomer in the presence of a stereo-specific polymerization catalyst by a known slurry polymerization, solution polymerization, liquid phase polymerization using olefin monomer as the medium, vapor phase polymerization, etc.

In a more specific example, the propylene monomer is polymerized in the presence of a catalyst system comprising a transition metal compound such as titanium trichloride, titanium tetrachloride, etc. alone or carried on a support mainly composed of a magnesium halide such as magnesium chloride, etc., and a organoaluminum compound such as triethylaluminum, diethylaluminum chloride, etc. After polymerizing the propylene monomer, the copolymer moiety (1 weight % of less) may be formed by further polymerizing a comonomer. The copolymer moiety is random and the amount thereof may be determined as the cold xylene solubles. Also, the first homopolypropylene may be produced by a reactor blend utilizing a multi-stage homopolymerization of propylene.

A-2 First ethylene-propylene block copolymer

The first ethylene-propylene block copolymer has an MFR of 2 to 30 g/10 min, preferably 2 to 20 g/10 min. When the MFR is less than 2 g/10 min, the resin composition is less flowable and the moldability, in particular, the injection moldability is deteriorated. An MFR exceeding 30 g/10 min undesirably reduces the mechanical strength of the molded articles. The isotatic pentad fraction (IPF) of the first ethylene-propylene block copolymer is preferably 95% or more, more preferably 97% or more. The other properties of the first ethylene-propylene block copolymer is the same as those of the ethylene-propylene block copolymer for the first preferred embodiment.

Also, the first ethylene-propylene block copolymer may be produced in the same method as described in the production of the ethylene-propylene block copolymer for the first preferred embodiment.

B Second propylene polymer component

The second propylene polymer component is at least one selected from the group consisting of a second homopolypropylene and a second ethylene-propylene block copolymer, and is contained 10 to 50 weight %, preferably 10 to 40 weight % based on the total weight of the components (A), (B), (C) and (D). If the content is less than 10 weight %, the stiffness, heat resistance and hardness of the molded articles are poor, and mechanical strength and ductility are reduced when exceeding 50 weight %. The total amount of the first propylene polymer component and the second propylene polymer component is preferably 30 to 80 weight % based on the total weight of the components (A), (B), (C) and (D).

B-1 Second homopolypropylene

The second homopolypropylene is basically the same as the first homopolypropylene except for having an MFR of 50 to 1000 g/10 min, preferably 100 to 600 g/10 min. When the MFR is less than 50 g/10 min, the resin composition is less flowable. An MFR exceeding 1000 g/10 min undesirably reduces the ductility of the resin composition and the mechanical strength of the molded articles. The second homopolypropylene may be produced in the same method as described in the production of the first homopolypropylene.

The MFR of the second homopolypropylene may be regulated within the specified range by a chain-length regulating treatment, in which a homopolypropylene having a relatively low MFR is kneaded in an extruder at 180° to 300° C. for 1 to 10 minutes in the presence of a chain-length regulator such as an organic peroxide, a sulfur-containing compound, etc. to reduce the molecular weight of the homopolypropylene. The organic peroxide may include t-butyl hydroperoxide, dicumyl peroxide, di-t-butyl peroxide, benzoyl peroxide, 2,5-dimethyl-2,5-di(t-butylperoxy)hexane, 2,5-dimethyl-2,5-di(t-butylperoxy)hexyne-3, methyl ethyl ketone peroxide, etc. Of the above peroxides, preferred are 2,5-dimethyl-2,5-di(t-butylperoxy)hexane and 2,5-dimethyl-2,5-di(t-butylperoxy)hexyne-3. As the sulfur-containing compound, trilauryl trithiophosphite, tristearyl trithiophosphite, etc. may be used. The chain-length regulator is selected according to the desired MFR range, and usually 0.001 to 2 parts by weight based on 100 parts by weight of a homopolypropylene being treated is used directly or in the form of masterbatch. By such a treatment, the second homopolypropylene having a MFR within the specified range can be easily obtained with a minimum loss of the monomer to improve the productivity, and also, the second homopolypropylene thus produced enhances the mechanical strength of the molded articles. The chain-length regulating treatment is also applicable to producing the first homopolypropylene.

B-2 Second ethylene-propylene block copolymer

The second ethylene-propylene block copolymer has an MFR of 50 to 1000 g/10 min, preferably 100 to 600 g/10 min. When the MFR is less than 50 g/10 min, the resin composition is less flowable. An MFR exceeding 1000 g/10 min undesirably reduces the ductility of the resin composition and the mechanical strength of the molded articles. The MFR may be regulated within the specified range by the chain-length regulating treatment described above. This treatment is also applicable to regulating the MFR of the first ethylene-propylene block copolymer. The other properties of the second ethylene-propylene block copolymer is the same as those of the ethylene-propylene block copolymer for the first preferred embodiment.

The isostatic pentad fraction (IPF) of the second ethylene-propylene block copolymer is preferably 95% or more, more preferably 97% or more.

Also, the second ethylene-propylene block copolymer may be produced in the same method as described in the production of the ethylene-propylene block copolymer for the first preferred embodiment.

C Styrene-containing elastomer component

The styrene-containing elastomer component is the same elastomeric styrene-containing block copolymer as described in the paragraph B-1 for the first preferred embodiment, and is contained 10 to 30 weight %, preferably 10 to 25 weight % based on the total weight of the components (A), (B), (C) and (D). If the content is less than 10 weight %, the impact strength of the molded articles is poor, and the mechanical strength, stiffness, heat resistance and hardness of the molded articles are reduced when exceeding 30 weight %.

D Talc

The talc used here is the same as that used in the first preferred embodiment, and added 10 to 40 weight %, preferably 10 to 30 weight % based on the total weight of the components (A), (B), (C) and (D). If the content is less than 10 weight %, the stiffness and the heat resistance of the molded articles are poor, and the ductility is reduced when exceeds 40 weight %.

E Other Additives

The same additives as used in the first preferred embodiment may be used in a respective amount of 0.05 to 2 parts by weight based on 100 parts by weight of the total of the above components (A), (B), (C) and (D).

The thermoplastic resin composition of the second preferred embodiment may be produced from the above ingredients in the same manner as in producing the first preferred embodiment. The second resin composition thus produced has an MFR of 20 to 50 g/10 min, preferably 25 to 35 g/10 min.

[3] Third Thermoplastic Resin Composition

The third preferred thermoplastic resin composition of the present invention contains (A) a first propylene polymer component having a relatively low melt flow rate, (B) a second propylene polymer component having a relatively high melt flow rate, (C) a styrene-containing elastomer component, and (D) talc as the essential components.

A First propylene polymer component

The first propylene polymer component is at least one selected from the group consisting of a first homopolypropylene and an ethylene-propylene random copolymer, and is contained 10 to 50 weight %, preferably 10 to 40 weight % based on the total weight of the components (A), (B), (C) and (D). If the content is less than 10 weight %, the ductility of the resin composition is poor, and the stiffness and heat resistance are reduced when exceeding 50 weight %.

A-1 First homopolypropylene

The first homopolypropylene for the third preferred embodiment is characterized by having an isostatic pentad fraction (IPF) of 90 to 95%, preferably 92 to 95%. If the IPF is less than 90%, the crystallinity of the first homopolypropylene is too low, this resulting in a poor stiffness and a raised heat distortion temperature of the molded articles.

The other properties of the first homopolypropylene is the same as those of the first homopolypropylene for the second preferred embodiment. Namely, the first homopolypropylene for the third preferred embodiment has a melt flow rate (MFR) of 2 to 30 g/10 min, preferably 2 to 20 g/10 min, and may include a crystalline random copolymer and block copolymer each containing a copolymerized component, for example, an α-olefin such as ethylene, butene-1, pentene-1, 4-methylpentene-1, heptene-1, hexene-1, octene-1, etc. in a small amount up to about 1 weight %.

A-2 Ethylene-propylene random copolymer

The ethylene-propylene random copolymer contains the ethylene unit in an amount of 0.1 to 1 weight % based on the copolymer. If the ethylene content is less than 0.1 weight %, the ductility of the resin composition would be poor, and a content exceeding 1 weight % results in a poor stiffness and a raised heat distortion temperature.

The MFR of the ethylene-propylene random copolymer is 2 to 30 g/10 min, preferably 2 to 20 g/10 min. When the MFR is less than 2 g/10 min, the resin composition is less flowable, and an MFR exceeding 30 g/10 min results in an insufficient ductility of the resin composition.

B Second propylene polymer component

The second propylene polymer component is a second homopolypropylene, and is contained 10 to 50 weight %, preferably 20 to 50 weight % based on the total weight of the components (A), (B), (C) and (D). If the content is less than 10 weight %, the stiffness, heat resistance and hardness of the molded articles are poor, and mechanical strength and ductility are reduced when exceeding 50 weight %. The total amount of the first propylene polymer component and the second propylene polymer component is preferably 30 to 80 weight % based on the total weight of the components (A), (B), (C) and (D).

The second homopolypropylene is the same as the second homopolypropylene used in the second preferred embodiment, namely, has an MFR of 50 to 1000 g/10 min, preferably 100 to 600 g/10 min, and an IPF of 95% or more, preferably 97% or more.

C Styrene-containing elastomer component

The styrene-containing elastomer component is the same elastomeric styrene-containing block copolymer as described in the paragraph B-1 for the first preferred embodiment, and is contained 10 to 30 weight %, preferably 10 to 25 weight % based on the total weight of the components (A), (B), (C) and (D). If the content is less than 10 weight %, the impact strength of the molded articles is poor, and the mechanical strength, stiffness, heat resistance and hardness of the molded articles are reduced when exceeding 30 weight %.

D Talc

The talc used here is the same as that used in the first preferred embodiment, and added 10 to 40 weight %, preferably 10 to 30 weight % based on the total weight of the components (A), (B), (C) and (D). If the content is less than 10 weight %, the stiffness and the heat resistance of the molded articles are poor, and the ductility is reduced when exceeds 40 weight %.

E Other Additives

The same additives as used in the first preferred embodiment may be used in a respective amount of 0.05 to 2 parts by weight based on 100 parts by weight of the total of the above components (A), (B), (C) and (D).

The thermoplastic resin composition of the third preferred embodiment may be produced from the above ingredients in the same manner as in producing the first preferred embodiment. The second resin composition thus produced has an MFR of 20 to 50 g/10 min, preferably 25 to 35 g/10 min.

The present invention will be further described while referring to the following Examples which should be considered to illustrate various preferred embodiments of the present invention. In the following examples and comparative examples, the propylene polymer components and the elastomer components shown below were used.

Ethylene-propylene block copolymer (BPP):
BJ715, BJ730X, TBJ580X6, BJ780, BJ790 and BJ540, all manufactured by Tonen Chemical Corporation.

Styrene-ethylene-butene-styrene copolymer (SEBS):
G1052, G1650, G1652, G1657 and G1701 all manufactured by Shell Chemical Co., and H1031, H1041, H1042, H1052, H1071 all manufactured by Asahi Chemical Industry Co., Ltd.

Styrene-ethylene-propylene-styrene copolymer (SEPS) K203 manufactured by Kuraray Co., Ltd.

Styrene-ethylene-propylene-styrene copolymer (SEP) G1701 manufactured by Shell Chemical Co.

Ethylene-propylene copolymer rubber (EPR)
EP961SP (MFR=0.8 g/10 min, ethylene content: 77 weight %) manufactured by Japan Synthetic Rubber Co., Ltd.

Ethylene-butene copolymer rubber (EBR)
EBM2011P (MFR=1 g/10 min, ethylene content: 80 weight %) manufactured by Japan Synthetic Rubber Co., Ltd.

EXAMPLES 1 TO 10, AND COMPARATIVE EXAMPLES 1 TO 7

The ingredients of the thermoplastic resin composition used here are shown below.

[1] Ethylene-propylene block copolymer (BPP)

TABLE 1

| Properties | BPP-1 | BPP-2 | BPP-3 | BPP-4 | BPP-5 | BPP-6 |
|---|---|---|---|---|---|---|
| MFR[1] (g/10 min) | 34 | 85 | 85 | 110 | 40 | 20[*] |
| $C_v$[2] (wt. %) | 11 | 9 | 9 | 9 | 13 | 10 |
| $G_v$[3] (wt. %) | 42 | 35 | 50 | 36 | 50 | 40 |
| $[\eta]_{CXS}$[4] (dl/g) | 5.0 | 5.3 | 5.0 | 4.8 | 3.5 | 4.0 |

Note:
[*]: Outside the range specified in the present invention.
[1]: MFR measured at 230° C. under a load of 2.16 kgf according to ASTM D1238.
[2]: $C_v$ is the content of the ethylene-propylene copolymer block (cold xylene solubles) in the ethylene-propylene block copolymer.
[3]: $G_v$ is the ethylene content in the ethylene-propylene copolymer block (cold xylene solubles).
[4]: $[\eta]_{CXS}$ is the intrinsic viscosity of the ethylene-propylene copolymer block (cold xylene solubles).

[2] SEBS and other elastomers

TABLE 2

| Properties | SEBS-1 | SEBS-2 | SEBS-3 | SEBS-4 | SEBS-5 | SEBS-6 |
|---|---|---|---|---|---|---|
| MFR[5] (g/10 min) | 8 | 2 | 0.1[*] | 5 | 30 | 12 |
| PS[6] (wt. %) | 13 | 29 | 29 | 30 | 20 | 20 |

| Properties | SEBS-7 | SEBS-8 | SEP | SEPS | EPR | EBR |
|---|---|---|---|---|---|---|
| MFR[1] (g/10 min) | 0.5 | 160[*] | 0.5 | 0.5 | 0.8 | 1 |
| PS[2] (wt. %) | 20 | 30 | 37 | 13 | — | — |

Note:
[*]: Outside the range specified in the present invention.
[1]: MFR measured at 230° C. under a load of 2.16 kgf according to ASTM D1238.
[2]: PS is the content of the polystyrene block in each of SEBS, SEP and SEPS.

[3] Talc

Talc having an average particle size of 1.2 μm (LMS300 manufactured by Fiji Talc K.K.) was used.

[4] Additives

The following additives were used.

Antioxidant-1: Irganox 1010 manufactured by Ciba-Geigy AG.

Antioxidant-2: Mark 2112 manufactured by Asahi Denka K.K.

Heat Stabilizer: Sumilizer TPS manufactured by Sumitomo Chemical Company, Ltd.

Light Stabilizer: Chimassorb 944 manufactured by Ciba-Geigy AG.

Each BPP, SEBS or other elastomer, the talc and the additives shown above were mixed in respective blending ratio shown in Table 3. After adding the antioxidant-1, antioxidant-2, heat stabilizer, and light stabilizer, each in an amount of 0.2 part by weight, to each 100 parts by weight of the mixture, the resulting mixture was dry-blended in a super mixer, melt-kneaded in a twin-screw extruder (PCM-45 manufactured by Ikegai K.K., L/D=32) at 200° C. and 200 rpm, and then extruded into the form of pellets to produce each thermoplastic resin composition.

Each resin composition was injection-molded by an injection molding machine (IS-90B manufactured by Toshiba Machine Co. Ltd.) under the conditions of the cylinder temperature of 210° C. and the mold temperature of 50° C. to produce each test specimen which was subjected to the following tests for evaluating the physical properties of the molded article. The results are shown in Table 3.

TABLE 3

|  | Examples | | | | | |
|---|---|---|---|---|---|---|
|  | 1 | 2 | 3 | 4 | 5 | 6 |
| Composition | | | | | | |
| BPP | | | | | | |
| Kind | BPP-1 | BPP-2 | BPP-3 | BPP-4 | BPP-5 | BPP-2 |
| Blend ratio (wt. %) | 64 | 63 | 63 | 63 | 65 | 63 |
| Elastomer | | | | | | |
| Kind | SEBS-1 | SEBS-2 | SEBS-2 | SEBS-2 | SEBS-2 | SEBS-1 |
| Blend ratio (wt. %) | 16 | 17 | 17 | 17 | 15 | 17 |
| Talc | | | | | | |
| Blend ratio (wt. %) | 20 | 20 | 20 | 20 | 20 | 20 |
| Properties | | | | | | |
| MFR[1] (g/10 min) | 25 | 31 | 32 | 45 | 22 | 41 |
| Tensile strength[2] (kg/cm$^2$) | 252 | 242 | 242 | 240 | 253 | 230 |
| Elongation at break[3] (%) | 500 | 600 | 300 | 300 | 600 | 300 |
| Bending modulus[4] (kg/cm$^2$) | 22400 | 25000 | 24700 | 24000 | 22600 | 22500 |
| Bending strength[5] (kg/cm$^2$) | 354 | 350 | 350 | 350 | 360 | 351 |
| Izod impact strength[6] (kg · cm/cm) | 28 | 26 | 24 | 23.5 | 28 | 31 |
| Heat distortion temperature[7] (°C.) | 80 | 74 | 74 | 74 | 75 | 77 |
| Rockwell hardness[8] | 70 | 76 | 75 | 75 | 74 | 70 |

|  | Examples | | | | Comparative Examples | |
|---|---|---|---|---|---|---|
|  | 7 | 8 | 9 | 10 | 1 | 2 |
| Composition | | | | | | |
| BPP | | | | | | |
| Kind | BPP-2 | BPP-2 | BPP-2 | BPP-2 | BPP-6 | BPP-2 |
| Blend ratio (wt. %) | 63 | 63 | 63 | 63 | 64 | 60 |
| Elastomer | | | | | | |
| Kind | SEBS-4 | SEBS-5 | SEBS-6 | SEBS-7 | SEBS-1 | EPR/EBR |
| Blend ratio (wt. %) | 17 | 17 | 17 | 17 | 16 | 10/10 |
| Talc | | | | | | |
| Blend ratio (wt. %) | 20 | 20 | 20 | 20 | 20 | 20 |
| Properties | | | | | | |
| MFR[1] (g/10 min) | 37 | 49 | 40 | 31 | 17 | 25 |
| Tensile strength[2] (kg/cm$^2$) | 246 | 235 | 238 | 235 | 260 | 236 |
| Elongation at break[3] (%) | 300 | 300 | 300 | 500 | 600 | 600 |
| Bending modulus[4] (kg/cm$^2$) | 22500 | 22300 | 22500 | 23200 | 23500 | 24000 |
| Bending strength[5] (kg/cm$^2$) | 366 | 351 | 356 | 356 | 350 | 340 |
| Izod impact strength[6] (kg · cm/cm) | 20 | 26 | 30 | 20 | 35 | 18.5 |
| Heat distortion temperature[7] (°C.) | 76 | 76 | 75 | 75 | 78 | 79 |
| Rockwell hardness[8] | 79 | 71 | 74 | 77 | 70 | 76 |

TABLE 3-continued

|  | Comparative Examples | | | | |
|---|---|---|---|---|---|
|  | 3 | 4 | 5 | 6 | 7 |
| Composition | | | | | |
| BPP | | | | | |
| Kind | BPP-2 | BPP-2 | BPP-2 | BPP-2 | BPP-2 |
| Blend ratio (wt. %) | 60 | 63 | 63 | 63 | 63 |
| Elastomer | | | | | |
| Kind | EPR | SEBS-3 | SEP | SEPS | SEBS-8 |
| Blend ratio (wt. %) | 20 | 17 | 17 | 17 | 17 |
| Talc | | | | | |
| Blend ratio (wt. %) | 20 | 20 | 20 | 20 | 20 |
| Properties | | | | | |
| MFR[1] (g/10 min) | 24 | 20 | 21 | 30 | 71 |
| Tensile strength[2] (kg/cm$^2$) | 226 | 237 | 217 | 223 | 257 |
| Elongation at break[3] (%) | 220 | 500 | 15 | 300 | 50 |
| Bending modulus[4] (kg/cm$^2$) | 22100 | 24000 | 22000 | 23000 | 23500 |
| Bending strength[5] (kg/cm$^2$) | 333 | 358 | 322 | 333 | 380 |
| Izod impact strength[6] (kg · cm/cm) | 18.8 | 12 | 30 | 15 | 8 |
| Heat distortion temperature[7] (°C.) | 70 | 77 | 74 | 76 | 73 |
| Rockwell hardness[8] | 68 | 79 | 73 | 74 | 78 |

Note:
[1]: MPR measured at 230° C. under a load of 2.16 kgf according to ASTM D1238.
[2]: Tensile strength was measured according to ASTM D638.
[3]: Elongation at break was measured according to ASTM D638.
[4]: Bending modulus was measured according to ASTM D790.
[5]: Bending strength was measured according to ASTM D790.
[6]: Izod impact strength was measured at 23° C. according to ASTM D256.
[7]: Heat distortion temperature was measured under a load of 18.6 kgf/cm$^2$ according to ASTM D648.
[8]: Rockwell hardness was measured according to ASTM D785 (R scale).

As seen from the results, each resin composition of Examples 1 to 10 had an MFR showing a good fluidity and well-balanced mechanical properties. On the other hand, in Comparative Examples 1 to 7, the MFR was low (insufficient fluidity) when the mechanical properties were rather well balanced, or the mechanical properties were not balanced when the composition was well flowable. Further, the composition containing a styrene-containing elastomer (SEP or SEPS) other than those specified in the present invention and the composition containing an olefin elastomer (EPR and EBR) were insufficient in ductility and impact strength.

EXAMPLES 11 TO 20 AND COMPARATIVE EXAMPLES 8 TO 11

The ingredients of the thermoplastic resin composition used here are shown below.

[1] Polypropylene Resin (PP)

TABLE 4

| Properties | PP-1 | PP-2 | PP-3 | PP-4 | PP-5 | PP-6 | PP-7 | PP-8 |
|---|---|---|---|---|---|---|---|---|
| MFR[1] (g/10 min) | 40 | 70 | 90 | 140 | 40 | 85 | 85 | 20 |
| IPF[2] (%) | 97.7 | 98.0 | 97.6 | 97.6 | 95.0 | 97.0 | 97.0 | 97.3 |

TABLE 4-continued

| Properties | PP-1 | PP-2 | PP-3 | PP-4 | PP-5 | PP-6 | PP-7 | PP-8 |
|---|---|---|---|---|---|---|---|---|
| C$_v$[3] (wt. %) | 0 | 0 | 0 | 0 | 0 | 2 | 9(*) | 0 |

Note:
(*): Outside the range specified in the present invention.
[1]: MFR measured in the same manner as above.
[2]: IPF is an isotactic pentad fraction measured by $^{13}$C-NMR.
[3]: C$_v$ is the content of the copolymer block (cold xylene solubles) in the polypropylene resin.

The MFR of each of PP-2 to PP-4 was regulated to the respective value by subjecting PP-1 to a chain-length regulating treatment.

[2] SEBS and other elastomers

TABLE 5

| Properties | SEBS-9 | SEBS-10 | SEBS-11 | SEBS-12 | SEBS-13 | SEPS | EPR |
|---|---|---|---|---|---|---|---|
| MFR[1] (g/10 min) | 1.6 | 30 | 12 | 5 | 160(*) | 0.5 | 0.8 |
| PS[2] (wt. %) | 29 | 20 | 20 | 30 | 30 | 13 | — |

Note:
(*): Outside the range specified in the present invention.
[1] and [2] are the same as in Table 2.

[3] Talc

The same talc as in Examples 1 to 10 was used.

[4] Additives

The same additives as in Examples 1 to 10 were used.

The resin compositions and the test specimens were produced in the same manner as in Examples 1 to 10. The physical properties measured on each specimen are shown in Table 6.

TABLE 6

| | Examples | | | | |
|---|---|---|---|---|---|
| | 11 | 12 | 13 | 14 | 15 |
| Composition | | | | | |
| PP | | | | | |
| Kind | PP-1 | PP-2 | PP-2 | PP-3 | PP-4 |
| Blend ratio (wt. %) | 57 | 58 | 57 | 57 | 57 |
| Elastomer | | | | | |
| Kind | SEBS-9 | SEBS-9 | SEBS-9 | SEBS-9 | SEBS-9 |
| Blend ratio (wt. %) | 23 | 22 | 23 | 23 | 23 |
| Talc | | | | | |
| Blend ratio (wt. %) | 20 | 20 | 20 | 20 | 20 |
| Properties | | | | | |
| MFR[(1)] (g/10 min) | 22 | 37 | 34 | 27 | 31 |
| Tensile strength[(2)] (kg/cm$^2$) | 230 | 235 | 229 | 226 | 233 |
| Elongation at break[(3)] (%) | 600 | 400 | 500 | 600 | 500 |
| Bending modulus[(4)] (kg/cm$^2$) | 21400 | 21900 | 21200 | 22500 | 24500 |
| Bending strength[(5)] (kg/cm$^2$) | 346 | 345 | 335 | 347 | 369 |
| Izod impact strength[(6)] (kg · cm/cm) | | | | | |
| at 23° C. | 42 | 29 | 38 | 36 | 28 |
| at −30° C. | 4.1 | 3.8 | 4.0 | 4.1 | 3.6 |
| Heat distortion temperature[(7)] (°C.) | 73 | 74 | 73 | 74 | 77 |
| Rockwell hardness[(8)] | 75 | 74 | 72 | 76 | 79 |
| Embrittle temperature[(9)] (°C.) | −20 | −12 | −15 | −15 | −13 |

| | Examples | | | | |
|---|---|---|---|---|---|
| | 16 | 17 | 18 | 19 | 20 |
| Composition | | | | | |
| PP | | | | | |
| Kind | PP-5 | PP-6 | PP-1 | PP-1 | PP-1 |
| Blend ratio (wt. %) | 58 | 59 | 59 | 60 | 58 |
| Elastomer | | | | | |
| Kind | SEBS-9 | SEBS-9 | SEBS-10 | SEBS-11 | SEBS-12 |
| Blend ratio (wt. %) | 22 | 21 | 21 | 20 | 22 |
| Talc | | | | | |
| Blend ratio (wt. %) | 20 | 20 | 20 | 20 | 20 |

TABLE 6-continued

| Properties | | | | | |
|---|---|---|---|---|---|
| MFR[(1)] (g/10 min) | 22 | 36 | 33 | 26 | 21 |
| Tensile strength[(2)] (kg/cm$^2$) | 266 | 226 | 238 | 241 | 264 |
| Elongation at break[(3)] (%) | 450 | 500 | 400 | 600 | 450 |
| Bending modulus[(4)] (kg/cm$^2$) | 22800 | 21300 | 23000 | 21300 | 22500 |
| Bending strength[(5)] (kg/cm$^2$) | 388 | 379 | 352 | 355 | 384 |
| Izod impact strength[(6)] (kg · cm/cm) | | | | | |
| at 23° C. | 23 | 37 | 26 | 33 | 22 |
| at −30° C. | 3.7 | 3.8 | 3.6 | 3.8 | 3.6 |
| Heat distortion temperature[(7)] (°C.) | 75 | 72 | 74 | 75 | 74 |
| Rockwell hardness[(8)] | 74 | 70 | 72 | 72 | 76 |
| Embrittle temperature[(9)] (°C.) | −13 | −12 | −12 | −20 | −12 |

| | Comparative Examples | | | |
|---|---|---|---|---|
| | 8 | 9 | 10 | 11 |
| Composition | | | | |
| PP | | | | |
| Kind | PP-7 | PP-8 | PP-1 | PP-1 |
| Blend ratio (wt. %) | 62 | 60 | 57 | 57 |
| Elastomer | | | | |
| Kind | SEBS-9 | SEBS-13 | SEPS | EPR |
| Blend ratio (wt. %) | 18 | 20 | 23 | 23 |
| Talc | | | | |
| Blend ratio (wt. %) | 20 | 20 | 20 | 20 |
| Properties | | | | |
| MFR[(1)] (g/10 min) | 33 | 37 | 11.5 | 13.6 |
| Tensile strength[(2)] (kg/cm$^2$) | 230 | 256 | 220 | 235 |
| Elongation at break[(3)] (%) | 600 | 100 | 30 | 600 |
| Bending modulus[(4)] (kg/cm$^2$) | 23400 | 21400 | 24000 | 23100 |
| Bending strength[(5)] (kg/cm$^2$) | 348 | 367 | 360 | 368 |
| Izod impact strength[(6)] (kg · cm/cm) | | | | |
| at 23° C. | 26 | 9 | 7 | 22 |
| at −30° C. | 3.0 | 2.1 | 2.5 | 3.5 |
| Heat distortion temperature[(7)] (°C.) | 74 | 70 | 75 | 77 |
| Rockwell hardness[(8)] | 76 | 74 | 78 | 72 |
| Embrittle temperature[(9)] (°C.) | −10 | −4 | 0 | −3 |

Note:
[(1)] to [(5)], and [(7)] to [(8)] are the same as in Table 3.
[(6)]Izod impact strength was measured at 23° C. and −30° C. according to ASTM D256.
[(9)]Embrittle temperature was measured according to ASTM D746.

As seen from the results, each resin composition of Examples 11 to 20 had an MFR showing a good fluidity and well-balanced mechanical properties. On the other hand, the comparative composition containing a polypropylene resin having an copolymer block content exceeding 2 weight % was deteriorated in the impact strength at a low temperature and had a high brittle temperature. Further, the comparative composition containing a styrene-containing elastomer having an MFR outside the range of the present invention or an elastomer (SEPS and EPR) other than those specified in the present invention was insufficient in the ductility and impact strength and had a high brittle temperature.

EXAMPLE 21 TO 24 AND COMPARATIVE EXAMPLES 12 TO 13

The ingredients of the thermoplastic resin composition used here are shown below.

[1] Ethylene-propylene block copolymer (BPP)

TABLE 7

| Properties | BPP-7 | BPP-8 |
|---|---|---|
| MFR[1] (g/10 min) | 85 | 85 |
| $C_v$[2] (wt. %) | 9 | 9 |
| $G_v$[3] (wt. %) | 50 | 35 |
| $[\eta]_{CXS}$[4] (dl/g) | 5.0 | 5.3 |

Note:
[1] to [4] are the same as in Table 1.

[2] SEBS and other elastomers

TABLE 8

| Properties | SEBS-14 | SEBS-15 | SEBS-16 | SEBS-17 | SEPS | EPR |
|---|---|---|---|---|---|---|
| MFR[1] (g/10 min) | 1.6 | 8 | 5 | 12 | 0.5 | 0.8 |
| PS[2] (wt. %) | 29 | 13 | 30 | 20 | 13 | — |

Note:
[1] and [2] are the same as in Table 2.

[3] Talc

Talc having an average particle size of 3.6 μm (AT164 manufactured by Asada Seifun K.K.) was used.

[4] Additives

The same additives as in Examples 1 to 10 were used.

The resin compositions and the test specimens were produced in the same manner as in Examples 1 to 10. The physical properties measured on each specimen are shown in Table 9.

TABLE 9

| | Examples | | | | Comparative Examples | |
|---|---|---|---|---|---|---|
| | 21 | 22 | 23 | 24 | 12 | 13 |
| Composition | | | | | | |
| BPP | | | | | | |
| Kind | BPP-7 | BPP-7 | BPP-7 | BPP-7 | BPP-8 | BPP-8 |
| Blend ratio (wt. %) | 61 | 63 | 61 | 61 | 63 | 60 |
| Elastomer | | | | | | |
| Kind | SEBS-14/SEBS-15 | SEBS-14/SEBS-15 | SEBS-14/SEBS-16 | SEBS-14/SEBS-17 | SEPS | EPR |
| Blend ratio (wt. %) | 9.5/9.5 | 8.5/8.5 | 9.5/9.5 | 9.5/9.5 | 17 | 20 |
| Talc | | | | | | |
| Blend ratio (wt. %) | 20 | 20 | 20 | 20 | 20 | 20 |
| Properties | | | | | | |
| MFR[1] (g/10 min) | 38 | 40 | 34 | 38 | 30 | 24 |
| Tensile strength[2] (kg/cm$^2$) | 236 | 249 | 236 | 233 | 223 | 226 |
| Elongation at break[3] (%) | 600 | 480 | 500 | 480 | 300 | 220 |
| Bending modulus[4] (kg/cm$^2$) | 22600 | 23600 | 22000 | 23000 | 23000 | 22100 |
| Bending strength[5] (kg/cm$^2$) | 342 | 363 | 343 | 343 | 333 | 333 |
| Izod impact strength[6] (kg · cm/cm) | | | | | | |
| at 23° C. | 36.0 | 30.0 | 34.1 | 33.3 | 15.0 | 18.8 |
| at −30° C. | 4.1 | 3.2 | 3.9 | 4.4 | 3.0 | 3.2 |
| Heat distortion temperature[7] (°C.) | 80 | 83 | 79 | 78 | 76 | 70 |
| Rockwell hardness[8] | 74 | 77 | 75 | 73 | 74 | 68 |
| Embrittle temperature[9] (°C.) | −20 | −15 | −16 | −18 | −5 | −2 |

Note:
[1] to [5] and [7] to [8] are the same as in Table 3, and [6] and [9] are the same as in Table 6.

As seen from the results, each resin composition of Examples 21 to 24 had an MFR showing a good fluidity and well-balanced mechanical properties. Since the comparative composition contains SEPS or EPR in place of a binary elastomer of the present invention, the mechanical properties were not well balanced, in particular, the comparative examples were insufficient in the ductility, impact strength and tensile properties, and had a raised brittle temperature.

EXAMPLES 25 TO 33 AND COMPARATIVE EXAMPLES 14 TO 16

The ingredients of the thermoplastic resin composition used here are shown below.

[1] Polypropylene Resin (PP)

TABLE 10

| Properties | PP-9 | PP-10 | PP-11 | PP-12 | PP-13 |
|---|---|---|---|---|---|
| MFR$^{(1)}$ (g/10 min) | 80 | 100 | 60 | 150 | 180 |
| IPF$^{(2)}$ (%) | 97.3 | 97.2 | 97.7 | 97.0 | 96.8 |
| $C_v^{(3)}$ (wt. %) | 0 | 0 | 0 | 0 | 0 |

Note:
$^{(1)}$ to $^{(3)}$ are the same as in Table 4.

The MFR of each of PP-9 to PP-13 was regulated to the respective value by subjecting a homopolypropylene having an MFR of 40 g/10 min to a chain length regulating treatment.

[2] SEBS and other elastomers

TABLE 11

| Properties | SEBS-18 | SEBS-19 | SEBS-20 | SEBS-21 | SEBS-22 |
|---|---|---|---|---|---|
| MFR$^{(1)}$ (g/10 min) | 1.6 | 8 | 5 | 30 | 1 |
| PS$^{(2)}$ (wt. %) | 29 | 13 | 30 | 20 | 40(*) |

| Properties | SEBS-23 | SEBS-24 | SEP | EPR |
|---|---|---|---|---|
| MFR$^{(1)}$ (g/10 min) | 12 | 0.5 | 0.5 | 0.8 |
| PS$^{(2)}$ (wt. %) | 20 | 20 | 37 | — |

Note:
(*): Outside the range specified in the present invention.
$^{(1)}$ and $^{(2)}$ are the same as in Table 2.

[3] Talc

The same talc as in Examples 21 to 24 was used.

[4] Additives

The same additives as in Examples 1 to 10 were used except for changing the light stabilizer to Sanol LS-770 manufactured by Sankyo Company, Ltd.

The resin compositions and the test specimens were produced in the same manner as in Examples 1 to 10. The physical properties measured on each specimen are shown in Table 12.

TABLE 12

| | Examples | | | | |
|---|---|---|---|---|---|
| | 25 | 26 | 27 | 28 | 29 |
| Composition | | | | | |
| PP | | | | | |
| Kind | PP-9 | PP-10 | PP-10 | PP-10 | PP-10 |
| Blend ratio (wt. %) | 57 | 57 | 57 | 57 | 56 |
| Elastomer | | | | | |
| Kind | SEBS-18/ SEBS-19 | SEBS-18/ SEBS-19 | SEBS-18/ SEBS-19/ SEBS-21 | SEBS-18/ SEBS-19/ /SEBS-23 | SEBS-18/ SEBS-19 |
| Blend ratio (wt. %) | 17/6 | 11.5/11.5 | 11.5/6.5/5 | 11.5/6.5/5 | 12/12 |
| Talc | | | | | |
| Blend ratio (wt. %) | 20 | 20 | 20 | 20 | 20 |
| Properties | | | | | |
| MFR$^{(1)}$ (g/10 min) | 25 | 31 | 36 | 37 | 33 |
| Tensile strength$^{(2)}$ (kg/cm$^2$) | 232 | 229 | 229 | 229 | 220 |
| Elongation at break$^{(3)}$ (%) | 430 | 600 | 460 | 600 | 600 |
| Bending modulus$^{(4)}$ (kg/cm$^2$) | 21900 | 23700 | 23900 | 23000 | 22000 |
| Bending strength$^{(5)}$ (kg/cm$^2$) | 353 | 342 | 343 | 336 | 334 |
| Izod impact strength$^{(6)}$ (kg · cm/cm) | | | | | |
| at 23° C. | 40.0 | 42.0 | 38.3 | 37.1 | 42.1 |
| at −30° C. | 4.4 | 6.0 | 4.4 | 4.5 | 5.3 |
| Heat distortion temperature$^{(7)}$ (°C.) | 80 | 80 | 78 | 77 | 78 |
| Rockwell hardness$^{(8)}$ | 76 | 74 | 75 | 73 | 70 |
| Embrittle temperature$^{(9)}$ (°C.) | −24 | −25 | −24 | −24 | −34 |

TABLE 12-continued

| | Examples | | | |
|---|---|---|---|---|
| | 30 | 31 | 32 | 33 |
| Composition | | | | |
| PP | | | | |
| Kind | PP-9 | PP-9 | PP-11 | PP-10 |
| Blend ratio (wt. %) | 60 | 57 | 57 | 57 |
| Elastomer | | | | |
| Kind | SEBS-18/ SEBS-19 | SEBS-18/ SEBS-23 | SEBS-18/ SEBS-21 | SEBS-18/ SEBS-20 |
| Blend ratio (wt. %) | 10/10 | 11.5/11.5 | 11.5/11.5 | 11.5/11.5 |
| Talc | | | | |
| Blend ratio (wt. %) | 20 | 20 | 20 | 20 |
| Properties | | | | |
| MFR[(1)] (g/10 min) | 33 | 28 | 26 | 27 |
| Tensile strength[(2)] (kg/cm$^2$) | 257 | 242 | 241 | 244 |
| Elongation at break[(3)] (%) | 420 | 420 | 460 | 500 |
| Bending modulus[(4)] (kg/cm$^2$) | 25400 | 24400 | 24700 | 24900 |
| Bending strength[(5)] (kg/cm$^2$) | 393 | 364 | 355 | 369 |
| Izod impact strength[(6)] (kg · cm/cm) | | | | |
| at 23° C. | 30.0 | 36.5 | 35.4 | 34.4 |
| at −30° C. | 3.0 | 4.2 | 3.8 | 3.4 |
| Heat distortion temperature[(7)] (°C.) | 84 | 80 | 80 | 79 |
| Rockwell hardness[(8)] | 85 | 77 | 75 | 77 |
| Embrittle temperature[(9)] (°C.) | −15 | −20 | −18 | −16 |

| | Comparative Examples | | |
|---|---|---|---|
| | 14 | 15 | 16 |
| Composition | | | |
| PP | | | |
| Kind | PP-12 | PP-13 | PP-9 |
| Blend ratio (wt. %) | 57 | 57 | 57 |
| Elastomer | | | |
| Kind | SEBS-18/ SEBS-22 | SEP | EPR |
| Blend ratio (wt. %) | 11.5/11.5 | 23 | 23 |
| Talc | | | |
| Blend ratio (wt. %) | 20 | 20 | 20 |
| Properties | | | |
| MFR[(1)] (g/10 min) | 28 | 29 | 20 |
| Tensile strength[(2)] (kg/cm$^2$) | 243 | 215 | 210 |
| Elongation at break[(3)] (%) | 120 | 20 | 30 |
| Bending modulus[(4)] (kg/cm$^2$) | 24900 | 23200 | 23600 |
| Bending strength[(5)] (kg/cm$^2$) | 368 | 322 | 330 |
| Izod impact strength[(6)] (kg · cm/cm) | | | |
| at 23° C. | 15.0 | 23.0 | 21.0 |
| at −30° C. | 3.3 | 5.6 | 3.0 |
| Heat distortion temperature[(7)] (°C.) | 78 | 77 | 70 |
| Rockwell hardness[(8)] | 80 | 74 | 65 |
| Embrittle temperature[(9)] (°C.) | −3 | −26 | −5 |

Note:
[(1)] to [(5)], and [(7)] to [(8)] are the same as in Table 3, and [(6)] and [(9)] are the same as in Table 6.

As seen from the results, each resin composition of Examples 25 to 33 had an MFR showing a good fluidity and well-balanced mechanical properties. On the other hand, the comparative examples showed a poor ductility and impact strength, and had a high brittle temperature. In particular, the comparative examples where SEP or EPR was used were poor in the tensile properties and bending properties.

EXAMPLES 34 TO 38 AND COMPARATIVE EXAMPLES 17 TO 18

The ingredients of the thermoplastic resin composition used here are shown below.

[1] Homopolypropylene (HPP)

TABLE 13

| Properties | HPP-1 | HPP-2 | HPP-3 | HPP-4 | HPP-5 | HPP-6 |
|---|---|---|---|---|---|---|
| MFR[1] (g/10 min) | 20 | 100 | 160 | 300 | 600 | 160 |
| $C_v^{[2]}$ (wt. %) | 0 | 0 | 0 | 0 | 0 | 0 |
| $G_v^{[3]}$ (wt. %) | 0 | 0 | 0 | 0 | 0 | 0 |
| IPF[4] (%) | 97.7 | 97.8 | 97.6 | 97.5 | 98.0 | 97.8 |

Note:
[1] to [3] are the same as in Table 1, and [4] is the same as in Table 4.

The MFR of each of HPP-2 to HPP-5 was regulated to the respective value by melt-extruding HPP-1 at 200° C. in the presence of an organic peroxide (2,5-dimethyl-2,5-di(t-butylperoxy)hexane) to reduce the molecular weight. HPP-6 and BPP-9 were not subjected to such a treatment.

[2] SEBS and other elastomers

TABLE 14

| Properties | SEBS-25 | SEBS-26 | SEPS | EPR |
|---|---|---|---|---|
| MFR[1] (g/10 min) | 1.6 | 8 | 0.5 | 0.8 |
| PS[2] (wt. %) | 29 | 13 | 13 | — |

Note:
[1] and [2] are the same as in Table 2.

[3] Talc

The same talc as used in Examples 1 to 10 was used.

[4] Additives

The same additives as used in Examples 1 to 10 were used.

The resin compositions and the test specimens were produced in the same manner as in Examples 1 to 10. The physical properties measured on each specimen are shown in Table 15.

TABLE 15

| | Examples | | | |
|---|---|---|---|---|
| | 34 | 35 | 36 | 37 |
| Composition | | | | |
| First propylene polymer | | | | |
| Kind | HPP-1 | HPP-1 | HPP-1 | HPP-1 |
| Blend ratio (wt. %) | 10 | 20 | 26 | 33 |
| Second propylene polymer | | | | |
| Kind | HPP-3 | HPP-3 | HPP-4 | HPP-5 |
| Blend ratio (wt. %) | 48 | 38 | 32 | 25 |
| Elastomer | | | | |
| Kind | SEBS-25 | SEBS-25/ SEBS-26 | SEBS-25/ SEBS-26 | SEBS-25/ SEBS-26 |
| Blend ratio (wt. %) | 22 | 11/11 | 11/11 | 11/11 |
| Talc | | | | |
| Blend ratio (wt. %) | 20 | 20 | 20 | 20 |
| Properties | | | | |
| MFR[1] (g/10 min) | 32 | 30 | 33 | 31 |
| Tensile strength[2] (kg/cm²) | 237 | 236 | 235 | 235 |
| Elongation at break[3] (%) | 500 | 500 | 500 | 500 |
| Bending modulus[4] (kg/cm²) | 23500 | 23500 | 24000 | 23500 |

TABLE 15-continued

| Bending strength[5] (kg/cm²) | 350 | 350 | 351 | 350 |
|---|---|---|---|---|
| Izod impact strength[6] (kg · cm/cm) | | | | |
| at 23° C. | 40 | 42 | 40 | 41 |
| at −30° C. | 4.3 | 4.5 | 4.2 | 4.4 |
| Heat distortion temperature[7] (°C.) | 77 | 78 | 77 | 77 |
| Rockwell hardness[8] | 76 | 76 | 76 | 76 |
| Embrittle temperature[9] (°C.) | −20 | −22 | −21 | −20 |

| | Example | Comparative Examples | |
|---|---|---|---|
| | 38 | 17 | 18 |
| Composition | | | |
| First propylene polymer | | | |
| Kind | HPP-1 | — | — |
| Blend ratio (wt. %) | 10 | — | — |
| Second propylene polymer | | | |
| Kind | HPP-6 | HPP-2 | HPP-2 |
| Blend ratio (wt. %) | 48 | 58 | 57 |
| Elastomer | | | |
| Kind | SEBS-25 | SEPS | EPR |
| Blend ratio (wt. %) | 22 | 22 | 23 |
| Talc | | | |
| Blend ratio (wt. %) | 20 | 20 | 20 |
| Properties | | | |
| MFR[1] (g/10 min) | 35 | 24 | 25 |
| Tensile strength[2] (kg/cm²) | 240 | 225 | 225 |
| Elongation at break[3] (%) | 500 | 50 | 60 |
| Bending modulus[4] (kg/cm²) | 23500 | 23000 | 23800 |
| Bending strength[5] (kg/cm²) | 350 | 350 | 340 |
| Izod impact strength[6] (kg · cm/cm) | | | |
| at 23° C. | 40 | 10 | 12 |
| at −30° C. | 4.2 | 3.0 | 2.5 |
| Heat distortion temperature[7] (°C.) | 76 | 72 | 73 |
| Rockwell hardness[8] | 76 | 73 | 70 |
| Embrittle temperature[9] (°C.) | −18 | −6 | 0 |

Note:
[1] to [9] are the same as in Table 6.

As seen from the results, each resin composition of Examples 34 to 38 had an MFR showing a good fluidity and well-balanced mechanical properties. The comparative example containing SEPS or EPR was insufficient in ductility and impact strength, and had a high brittle temperature.

EXAMPLES 39 TO 45 AND COMPARATIVE EXAMPLES 19 to 20

The ingredients of the thermoplastic resin composition used here are shown below.

[1] Homopolypropylene (HPP) and Ethylene-propylene random copolymer (RPP))

TABLE 16

| Properties | HPP-7 | HPP-8 | HPP-9 | HPP-10 |
|---|---|---|---|---|
| MFR[1] (g/10 min) | 2 | 20 | 160 | 200 |
| IPF[2] (%) | 94.9 | 94.8 | 97.5 | 97.8 |
| $C_v^{[3]}$ (wt. %) | 0 | 0 | 0 | 0 |
| $C_2^{[4]}$ (wt. %) | 0 | 0 | 0 | 0 |

TABLE 16-continued

| Properties | HPP-11 | HPP-12 | RPP-1 | RPP-2 |
|---|---|---|---|---|
| MFR[1] (g/10 min) | 300 | 160 | 3 | 5 |
| IPF[2] (%) | 97.5 | 98.0 | — | — |
| $C_v$[3] (wt. %) | 0 | 0 | — | — |
| $C_2$[4] (wt. %) | 0 | 0 | 0.4 | 0.6 |

Note:
[1] and [3] are the same as in Table 1, and [2] is the same as in Table 4.
[4]: $C_2$ is the ethylene content in the propylene polymer.

The MFR of each of HPP-4 to HPP-7 was regulated to the respective value by melt-extruding HPP-3 at 200° C. in the presence of an organic peroxide (2,5-dimethyl-2,5-di(t-butylperoxy)hexane) to reduce the molecular weight. The other propylene polymers were not subjected to such a treatment.

[2] SEBS and other elastomers

TABLE 17

| Properties | SEBS-27 | SEBS-28 | SEPS | EPR |
|---|---|---|---|---|
| MFR[1] (g/10 min) | 1.6 | 8 | 0.5 | 0.8 |
| PS[2] (wt. %) | 29 | 13 | 13 | — |

Note:
[1] and [2] are the same as in Table 2.

[3] Talc
The same talc as used in Examples 1 to 10 was used.
[4] Additives
The same additives as used in Examples 1 to 10 were used.

The resin compositions and the test specimens were produced in the same manner as in Examples 1 to 10. The physical properties measured on each specimen are shown in Table 18.

TABLE 18

| | Examples | | | | |
|---|---|---|---|---|---|
| | 39 | 40 | 41 | 42 | 43 |
| Composition | | | | | |
| *First propylene polymer* | | | | | |
| Kind | RPP-1 | RPP-2 | HPP-7 | HPP-8 | HPP-8 |
| Blend ratio (wt. %) | 10 | 10 | 10 | 10 | 20 |
| *Second propylene polymer* | | | | | |
| Kind | HPP-10 | HPP-10 | HPP-10 | HPP-9 | HPP-9 |
| Blend ratio (wt. %) | 48 | 48 | 48 | 48 | 38 |
| *Elastomer* | | | | | |
| Kind | SEBS-27/SEBS-28 | SEBS-27/SEBS-28 | SEBS-27/SEBS-28 | SEBS-27 | SEBS-27/SEBS-28 |
| Blend ratio (wt. %) | 11/11 | 11/11 | 11/11 | 22 | 11/11 |
| *Talc* | | | | | |
| Blend ratio (wt. %) | 20 | 20 | 20 | 20 | 20 |
| Properties | | | | | |
| MFR[1] (g/10 min) | 31 | 32 | 30 | 32 | 30 |
| Tensile strength[2] (kg/cm$^2$) | 240 | 238 | 239 | 237 | 236 |
| Elongation at break[3] (%) | 600 | 600 | 600 | 600 | 600 |
| Bending modulus[4] (kg/cm$^2$) | 23500 | 23400 | 23600 | 23500 | 23500 |
| Bending strength[5] (kg/cm$^2$) | 352 | 350 | 351 | 350 | 350 |
| Izod impact strength[6] (kg · cm/cm) | | | | | |
| at 23° C. | 42 | 43 | 42 | 40 | 42 |
| at −30° C. | 4.4 | 4.5 | 4.3 | 4.3 | 4.5 |
| Heat distortion temperature[7] (°C.) | 76 | 76 | 77 | 77 | 78 |
| Rockwell hardness[8] | 76 | 76 | 76 | 76 | 76 |
| Embrittle temperature[9] (°C.) | −20 | −22 | −21 | −20 | −22 |

| | Examples | | Comparative Examples | |
|---|---|---|---|---|
| | 44 | 45 | 19 | 20 |
| Composition | | | | |
| *First propylene polymer* | | | | |
| Kind | HPP-8 | HPP-8 | RPP-1 | RPP-1 |
| Blend ratio (wt. %) | 26 | 10 | 57 | 57 |

TABLE 18-continued

| Second propylene polymer | | | | |
|---|---|---|---|---|
| Kind | HPP-11 | HPP-12 | — | — |
| Blend ratio (wt. %) | 32 | 48 | — | — |
| Elastomer | | | | |
| Kind | SEBS-27/ SEBS-28 | SEBS-27 | SEPS | EPR |
| Blend ratio (wt. %) | 11/11 | 22 | 23 | 23 |
| Talc | | | | |
| Blend ratio (wt. %) | 20 | 20 | 20 | 20 |
| Properties | | | | |
| MFR[(1)] (g/10 min) | 33 | 35 | 33 | 35 |
| Tensile strength[(2)] (kg/cm$^2$) | 235 | 236 | 220 | 220 |
| Elongation at break[(3)] (%) | 600 | 600 | 30 | 40 |
| Bending modulus[(4)] (kg/cm$^2$) | 24000 | 23500 | 23100 | 23300 |
| Bending strength[(5)] (kg/cm$^2$) | 351 | 350 | 344 | 335 |
| Izod impact strength[(6)] (kg · cm/cm) | | | | |
| at 23° C. | 40 | 40 | 10 | 12 |
| at −30° C. | 4.2 | 4.5 | 3.0 | 2.4 |
| Heat distortion temperature[(7)] (°C.) | 77 | 77 | 72 | 73 |
| Rockwell hardness[(8)] | 76 | 76 | 73 | 71 |
| Embrittle temperature[(9)] (°C.) | −21 | −20 | −3 | −1 |

Note:
[(1)] to [(9)] are the same as in Table 6.

As seen from the results, each resin composition of Examples 39 to 45 had an MFR showing a good fluidity and well-balanced mechanical properties. The comparative example containing SEPS or EPR was insufficient in ductility and impact strength, and had a high brittle temperature.

As described above, the thermoplastic resin composition of the present invention is excellent in the moldability and the ductility, and can provide a molded article having mechanical properties well balanced. Therefore, with such a resin composition, the injection molding conditions can be widely selected, and a large-sized article with a thin wall can be easily molded. The resin composition of the present invention is suitable for injection molding, for example, a inner or outer lining material for automobiles and an appliance part.

What is claimed is:

1. A thermoplastic resin composition having a melt flow rate (230° C., 2.16 kgf) of 20 to 50 g/10 min consisting essentially of:
    (A) 30 to 80 weight % of a propylene polymer component selected from the group consisting of an ethylene-propylene block copolymer and a polypropylene resin, said ethylene-propylene block copolymer having a melt flow rate (230° C., 2.16 kgf) of 85 to 200 g/10 min and consisting essentially of (a) 70 to 99 weight % of a crystalline propylene polymer block and (b) 1 to 30 weight % of an ethylene-propylene copolymer block having an ethylene content of 20 to 80 weight % and an intrinsic viscosity [η]$_{CXS}$ (cold xylene solubles) of 2 to 7 dl/g; and said polypropylene resin having a melt flow rate (230° C., 2.16 kgf) of 80 to 200 g/10 min, an isotactic pentad fraction of 95% or more and a copolymer block content of 0 to 2 weight %;
    (B) 5 to 30 weight % of a binary elastomer consisting essentially of (a) 40 to 80 weight % of at least one elastomeric styrene-containing block copolymer having a melt flow rate (230° C., 2.16 kgf) of 0.5 to 1.6 g/10 min and a polystyrene block content of 10 to 30 weight % and (b) 20 to 60 weight % of another at least one elastomeric styrene-containing block copolymer having a melt flow rate (230° C., 2.16 kgf) of 4 to 100 g/10 min and a polystyrene block content of 10 to 30 weight %, and each of said elastomeric styrene-containing block copolymers constituting said binary elastomer being represented by the following formula (I) or (II):

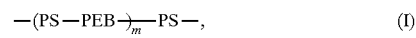

and

wherein PS is the polystyrene block, PEB is a poly(ethylene-butene) block and m is an integer of 1 or more; and
    (C) 10 to 40 weight % of talc having an average particle size of 5 μm or less.

2. The thermoplastic resin composition according to claim 1, wherein a difference in the melt flow rate between said elastomeric styrene-containing block copolymer having a melt flow rate of 4 to 100 g/10 min and said elastomeric styrene-containing block copolymer having a melt flow rate of 0.5 to 1.6 g/10 min, each constituting said binary elastomer, is 3 g/10 min or more.

3. A thermoplastic resin composition having a melt flow rate (230° C., 2.16 kgf) of 20 to 50 g/10 min, consisting essentially of:
    (A) 10 to 50 weight % of at least one propylene polymer component selected from the group consisting of a first homopolypropylene and an ethylene-propylene block copolymer, each having a melt flow rate (230° C., 2.16 kgf) of 2 to 30 g/10 min;
    (B) 10 to 50 weight % of a second homopolypropylene having a melt flow rate (230° C., 2.16 kgf) of 100 to 1000 g/10 min;
    (C) 10 to 30 weight % of an elastomeric styrene-containing block copolymer having a melt flow rate (230° C., 2.16 kgf) of 0.5 to 40 g/10 min and a polystyrene block content of 10 to 30 weight %, and being represented by the following formula (I) or (II):

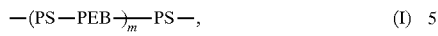 (I)

and

 (II)

wherein PS is said polystyrene block, PEB is a poly(ethylene-butene) block and m is an integer of 1 or more; and (D) 10 to 40 weight % of talc having an average particle size of 5 µm or less.

4. The thermoplastic resin composition according to claim 3, wherein the melt flow rate of said second homopolypropylene is regulated within the range of 100 to 1000 g/10 min by subjecting a corresponding polymer having a melt flow rate smaller (230° C., 2.16 kgf) than 50 g/10 min to a chain length regulating treatment.

5. A thermoplastic resin composition comprising:

(A) 10 to 50 weight % of at least one first propylene polymer component selected from the group consisting of a first homopolypropylene and an ethylene-propylene random copolymer, said first homopolypropylene having a melt flow rate (230° C., 2.16 kgf) of 2 to 30 g/10 min and an isotactic pentad fraction of 90 to 95%, and said ethylenepropylene random copolymer having a melt flow rate (230° C., 2.16 kgf) of 2 to 30 g/10 and an ethylene content of 0.1 to 1 weight %;

(B) 10 to 50 weight % of a second homopolypropylene having a melt flow rate (230° C., 2.16 kgf) of 100 to 1000 g/10 min;

(C) 10 to 30 weight % of an elastomeric styrene-containing block copolymer having a melt flow rate (230° C., 2.16 kgf) of 0.5 to 40 g/10 min and a polystyrene block content of 10 to 30 weight %, and being represented by the following formula (I) or (II):

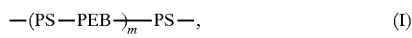 (I)

and

 (II)

wherein PS is said polystyrene block, PEB is a poly(ethylene-butene) block and m is an integer of 1 or more; and (D) 10 to 40 weight % of talc having an average particle size of 5 µm or less.

6. The thermoplastic resin composition according to claim 5, wherein the melt flow rate of said second homopolypropylene is regulated within the range of 50 to 1000 g/10 min by subjecting a homopolypropylene having a melt flow rate smaller than 50 g/10 min to a chain length regulating treatment.

7. A thermoplastic resin composition having a melt flow rate (230° C., 2.16 kgf) of 20 to 50 g/10 min, consisting essentially of:

(A) 30 to 80 weight % of a polypropylene resin having a melt flow rate of (230° C., 2.16 kgf) of 85 to 200 g/10 min, an isotactic pentad fraction of 95% or more and a copolymer block content of 0 to 2 weight %;

(B) 10 to 30 weight % of an elastomeric styrene-containing block copolymer having a melt flow rate (230° C., 2.16 kgf) of 0.5 to 40 g/10 min and a polystyrene block content of 10 to 30 weight % and being represented by the following formula (I) or (II):

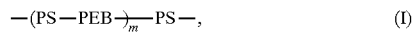 (I)

and

 (II)

wherein PS is said polystyrene block, PEB is a poly(ethylene-butene) block and m is an integer of 1 or more; and (C) 10 to 40 weight % of talc having an average particle size of 5 µm or less.

* * * * *